US007511972B2

(12) United States Patent
Mohandes

(10) Patent No.: US 7,511,972 B2
(45) Date of Patent: Mar. 31, 2009

(54) DC-DC CONVERTER RECYCLING LEAKAGE INDUCTOR LOSSES VIA AUXILIARY DC REGULATOR

(75) Inventor: Bijan Etheridge Mohandes, Berkshire (GB)

(73) Assignee: Micrel, Inc., San Jose, CA (US)

( * ) Notice: Subject to any disclaimer, the term of this patent is extended or adjusted under 35 U.S.C. 154(b) by 294 days.

(21) Appl. No.: 11/464,971

(22) Filed: Aug. 16, 2006

(65) Prior Publication Data

US 2008/0043498 A1 Feb. 21, 2008

(51) Int. Cl.
*H02M 3/335* (2006.01)
(52) U.S. Cl. .......................... 363/16; 363/101; 363/178
(58) Field of Classification Search .................. 363/16, 363/101, 178
See application file for complete search history.

(56) References Cited

U.S. PATENT DOCUMENTS

| | | | | | |
|---|---|---|---|---|---|
| 4,652,809 | A | * | 3/1987 | Barn | 323/282 |
| 5,379,206 | A | * | 1/1995 | Davidson | 363/55 |
| 5,381,327 | A | * | 1/1995 | Yan | 363/24 |
| 5,383,106 | A | * | 1/1995 | Yoshida et al. | 363/15 |
| 5,694,302 | A | * | 12/1997 | Faulk | 363/16 |
| 6,295,213 | B1 | * | 9/2001 | Smith | 363/21.01 |
| 6,538,906 | B1 | * | 3/2003 | Ke et al. | 363/21.02 |

OTHER PUBLICATIONS

"Leakage Inductance," Wikipedia, the free encyclopedia, downloaded on May 4, 2006 from http://en.wikipedia.org/wiki/Leakage_inductance, 1 page.
Lloyd H. Dixon, Jr, "The Effects of Leakage Inductance on Switching Power Supply Performance," Texas Instruments Incorporated literature, pp. R4-1 to R4-7.

* cited by examiner

*Primary Examiner*—Shawn Riley
(74) *Attorney, Agent, or Firm*—Patent Law Group LLP; Brian D. Ogonowsky

(57) ABSTRACT

A technique performed by a transformer-coupled DC-DC converter is described for recovering energy, due to leakage inductance in the transformer. A main power supply, providing a power supply voltage to a Vin terminal, is intermittently coupled to the primary winding of the transformer by a switching transistor. When the switching transistor is turned off, creating a voltage spike in the primary winding due to leakage inductance, the spike is conducted by a forward biased diode and filtered by a capacitor. The voltage at the capacitor (Vc) is then applied as an input voltage to a small pulse width modulated (PWM) regulator. The output of the PWM regulator is coupled to the Vin terminal along with the main power supply. The PWM regulator regulates the input voltage Vc to be a predetermined amount above the power supply voltage. Since the voltage spike energy is used to create the input voltage for the PWM regulator, and the output of the PWM regulator is fed back into the Vin terminal, the energy is recovered. Also, since Vc can be set to be any voltage above Vin, the voltage across the switching transistor is greatly limited.

16 Claims, 4 Drawing Sheets

Q1 or Q2 voltage

US 7,511,972 B2

DC-DC CONVERTER RECYCLING LEAKAGE INDUCTOR LOSSES VIA AUXILIARY DC REGULATOR

FIELD OF THE INVENTION

This invention relates to transformer-coupled voltage converters and, in particular, to a technique to recover switching losses due to leakage inductance in the transformer.

BACKGROUND

Transformer-coupled voltage converters are very common and are frequently used to generate a desired voltage at an output stage, where the output stage is electrically isolated from the input stage. The output voltage is typically different from the input voltage and may be a regulated voltage, a non-regulated voltage, a stepped up voltage, a stepped down voltage, or an inverted voltage. A transformer-coupled converter is particularly useful if a common ground is not desired.

Transformers typically have some leakage inductance due to imperfect coupling of the windings via the core, resulting in the creation of leakage flux. The leakage flux alternately stores and discharges magnetic energy with each electrical cycle and thus effectively acts as an inductor in series in each of the primary and secondary circuits. The leakage flux is typically wasted, reducing the efficiency of the converter.

FIG. 1A illustrates a prior art push-pull regulator 10, which is a type of forward converter. The unregulated DC input voltage (Vin) is filtered by a capacitor Cin and is applied to the center tap of the primary winding of a transformer T. Bipolar transistors Q1 and Q2 alternately conduct to alternately energize each side of the primary winding. The currents through the primary winding are magnetically coupled to the secondary winding to generate currents through the secondary windings. The currents and voltages produced at the output of the transformer depend on the winding turns ratio, the switching frequency, the duty cycle, the sizes of the components, and other factors. The pulses generated by the secondary windings are rectified by diodes D and filtered by inductor L and capacitor Cout to provide a DC regulated voltage Vo at the output of the regulator 10.

A control circuit 14 receives the output voltage, or a scaled version of the output voltage, and compares this feedback voltage to a reference voltage. The control circuit then adjusts the frequency or duty cycle of switching to keep the feedback voltage matched to the reference voltage.

If the input voltage is a battery or other variable voltage, then feedback is needed to control the output voltage. If regulation is not required, feedback is not necessary.

The maximum voltage across each of the transistors Q1 and Q2 is ideally only double the input voltage Vin. However, due to leakage inductances in the windings, high voltage spikes may appear across the transistor Q1 or Q2 after the transistor turns off.

FIG. 1B illustrates the voltages across either transistor Q1 or Q2. When a switch Q or Q2 is on, the voltage across that switch is essentially zero volts. When neither switch is on, the voltage across both switches is Vin. When one switch is on and the other is off, the voltage across the off switch is 2Vin due to the transformer voltage being "reflected" from the active primary winding to the inactive primary winding.

Voltage spikes occur during switching due to leakage inductance, where energy is not perfectly transferred from the primary winding to the secondary winding. Such spikes may be hundreds of volts. To prevent such spikes, snubber circuits are sometimes added to dissipate that energy. In FIG. 1A, the snubber circuits are the RC filters (Rs1/Cs1 and Rs2/Cs2). Such energy is wasted in the snubber circuits.

It would be desirable to recover the energy normally wasted by the snubber circuits.

SUMMARY

A technique performed by a transformer-coupled DC-DC converter is described for recovering energy, due to leakage inductance in the transformer, which would normally be wasted.

The converter may be a push-pull forward converter and need not regulate the output voltage. In a push-pull embodiment, a center tap of the primary winding is connected to a power source, which is coupled to a voltage input (Vin) terminal. The other ends of the primary windings are connected to switching transistors connected to ground. The transistors are alternately switched to generate a converted voltage at an output stage connected to the secondary windings. If voltage regulation is desired, a scaled version of the output voltage may be fed back to the switching controller to adjust a duty cycle of the transistors so that the scaled voltage matches a reference voltage.

When a transistor is switched off, creating a voltage spike due to leakage inductance, the spike is conducted by a forward biased diode and filtered by a capacitor. The voltage at the capacitor (Vc) is then applied as an input voltage to a small pulse width modulated (PWM) regulator. The output of the PWM regulator is coupled to the Vin terminal along with the main power source. The PWM regulator receives, as feedback signals, scaled versions of Vc and Vin and controls the Vc feedback signal to match the Vin feedback signal. The PWM regulator causes Vc to be at a clamped voltage with a predetermined Vc/Vin ratio. Therefore, the transistors see a maximum of Vc across the transistors. Since the voltage spike energy is used to create the input voltage for the PWM regulator, and the output of the PWM regulator is fed back into the Vin terminal, the energy is recovered. Also, since Vc can be set to be any voltage above Vin, the voltage across the transistors is greatly limited.

The invention can be applied to other types of transformer-coupled converters, and regulators other than PWM regulators may be used.

BRIEF DESCRIPTION OF THE DRAWINGS

Elements with the same numbers in the various figures are the same.

DETAILED DESCRIPTION

Figure 1A:
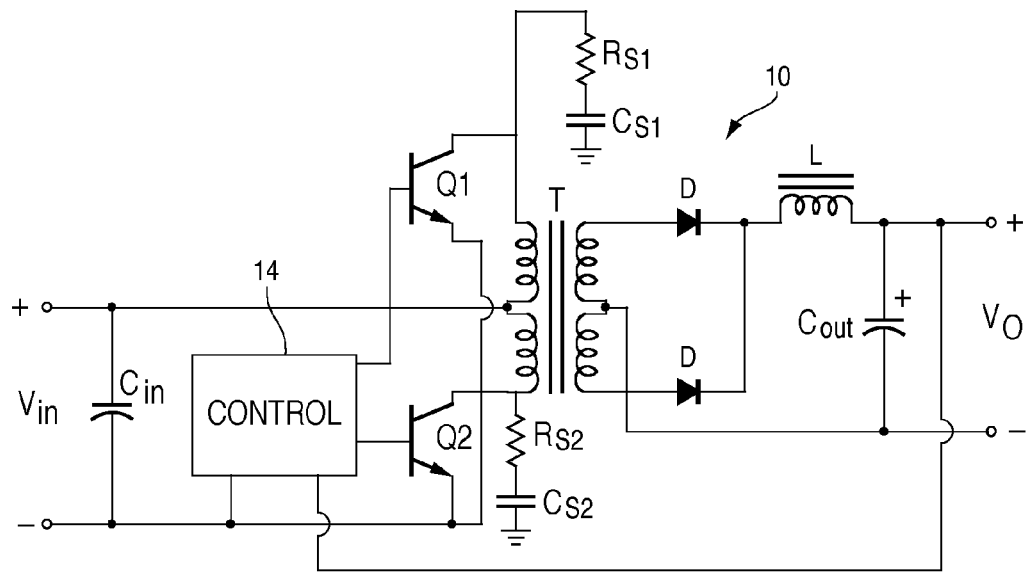
FIG. 1A is a schematic diagram of one embodiment of a prior art push-pull regulator circuit with snubbers for dampening voltage spikes.
Figure 1B:
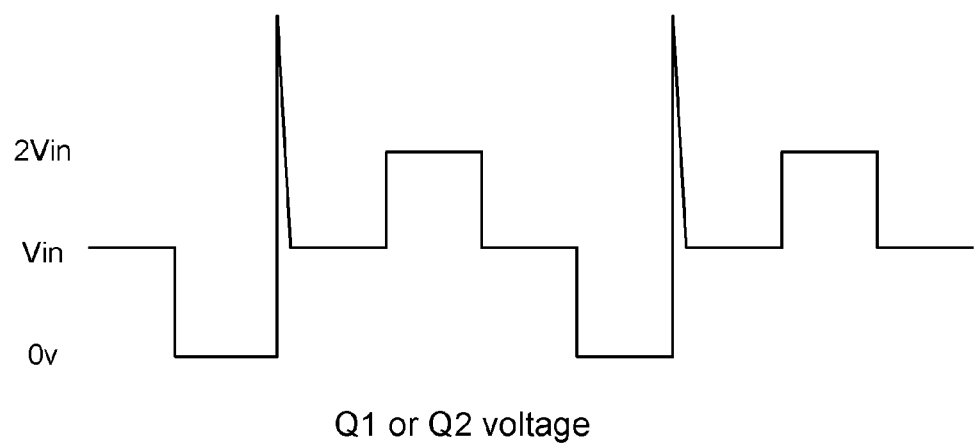
FIG. 1B illustrates the voltage vs. time at the collector terminal of either Q1 or Q2 in FIG. 1A, showing a spike when the transistor turns off.
Figure 2:
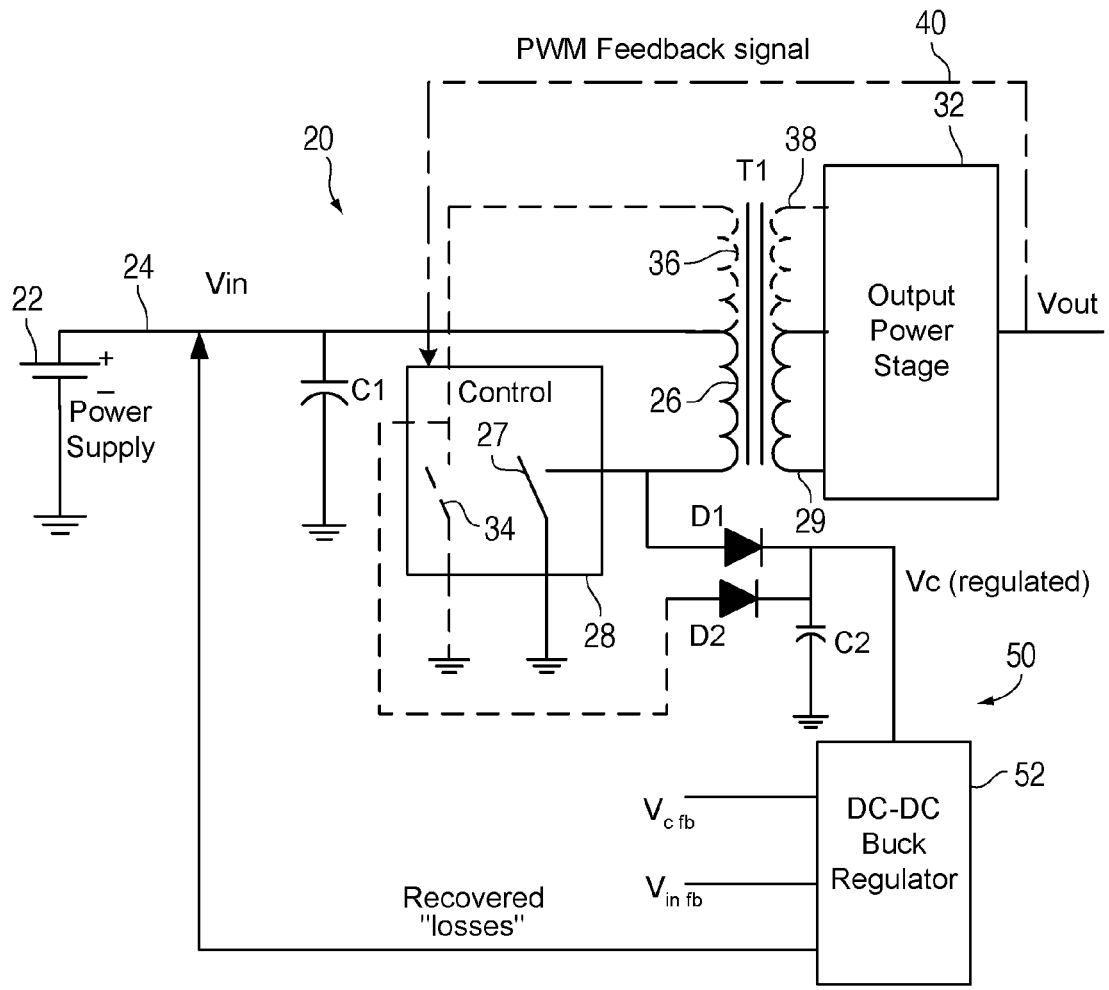
FIG. 2 is a block diagram of one embodiment of the invention. The circuit may optionally be a push-pull type, as shown in dashed outline.
Figure 3:
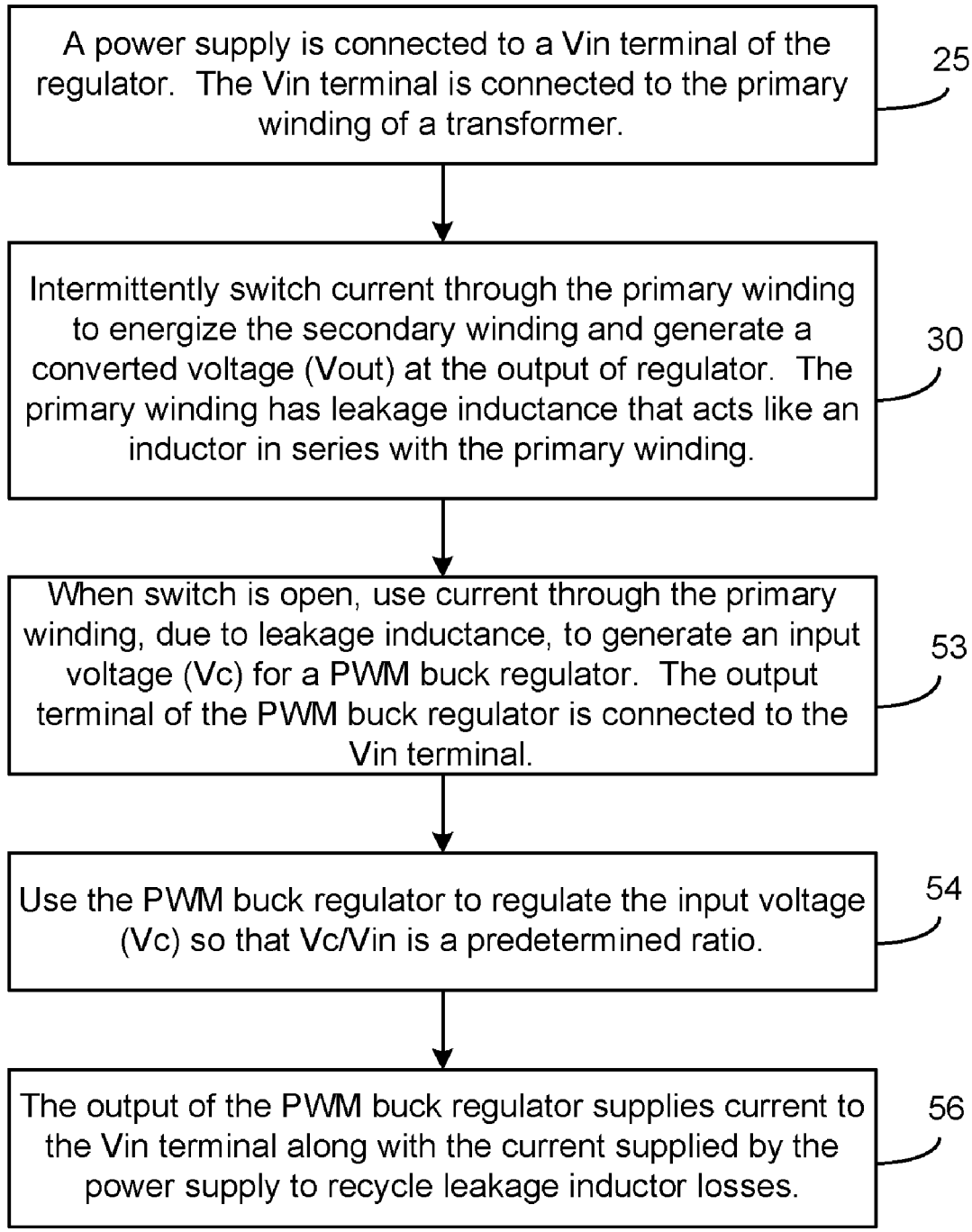
FIG. 3 is a flow chart identifying basic steps carried out in one embodiment of the invention.

FIG. 2 illustrates a voltage converter 20 in accordance with one embodiment of the invention. The operation of FIG. 2 will be described with reference to the flowchart of FIG. 3. FIG. 3 is a flowchart identifying the basic steps performed by the converter 20 of FIG. 2.

A power supply 22 is connected to a Vin terminal 24 (step 25 of FIG. 3). The power supply may be a battery, a rectified and smoothed AC signal, or a DC voltage from any other source.

Since the present invention is independent of the particular type of converter and output power stage used, the description of the converter portion and output power stage portion of FIG. 2 will only be briefly discussed. More detail of a particular embodiment is discussed with respect to FIG. 4.

A capacitor C1 is connected between the Vin terminal and ground to smooth ripples. The smoothed voltage is the input voltage (Vin) to the center tap of the primary winding 26 of transformer T1. A first transistor switch 27 is controlled by a controller 28 to turn on and off at a particular frequency and duty cycle. Switch 27 may be a MOSFET, a bipolar transistor, or any other type of switch. When switch 27 is closed, current ramps up through the primary winding 26, causing a ramping current to flow through the secondary winding 29 (step 30 of FIG. 3). The voltage produced by the secondary winding 29 depends on the turns ratio of the primary and secondary windings. An output power stage 32 smoothes the ramping waveform of the secondary winding and outputs a DC voltage (Vout) at the output of the converter 20. Many different types of output power stages 32 can be used, and such power stages are well known.

When the switch 27 turns off, and if the output power stage 32 incorporates an inductor (shown in FIG. 4), the stored inductor energy in the output power stage 32 discharges into a smoothing output capacitor (part of the output power stage 32) for supplying a constant DC voltage to the load.

If the converter is a push-pull type, the circuitry in dashed outline will also be employed. The controller 28 controls switch 34 to be on at a time when switch 27 is off. The switches 27 and 34 should have the same duty cycle. When switch 34 is on, the current ramps through the upper primary winding 36 and upper secondary winding 38 in a manner identical to that described with respect to the closing of switch 27. The turning on and off of switches 27 and 34 supplies ripples of current to a smoothing output capacitor (not shown in FIG. 2) to supply a constant DC voltage to the load. This push-pull operation is an efficient use of the transformer.

If a regulated output voltage Vout is desired, a resistor divider connected between Vout and ground is used to supply a scaled voltage to the input of an error amplifier (not shown). The other input of the error amplifier is connected to a reference voltage. The output of the error amplifier is a voltage corresponding to the switching duty cycle needed to match the scaled output voltage to the reference voltage. The controller 28 adjusts the duty cycle of the switches 27 and 34 based on the output of the error amplifier. Such feedback control for pulse width modulation (PWM) is well known and is generally illustrated in FIG. 2 by the feedback path 40.

When either switch 27 or 34 turns off, there is a voltage spike due to leakage inductance in transformer T1. The leakage inductance acts like an inductor in series with the primary winding. This voltage spike may exceed 100 volts. Typically, the voltage spike is dissipated by a snubber, and its energy is wasted. FIG. 2 illustrates a recovery circuit 50 that limits the voltage across the transistor switches 27 and 34 and recovers the energy in the voltage spike by supplying the resultant current back to the Vin input terminal to contribute to the current supplied by the main power supply 22.

When switch 27 turns off, the voltage spike from winding 26 is conducted by diode D1 and smoothed by capacitor C2.

Similarly, when switch 34 turns off, the voltage spike from winding 36 is conducted by diode D2 and smoothed by capacitor C2. The smoothed voltage (Vc) is applied as an input voltage for a PWM buck regulator 52 (step 53 in FIG. 3). The output of the regulator 52 generates a voltage equal to the input voltage Vin of the converter 20 and is connected to the Vin terminal 24. The Vc voltage and the Vin voltage on terminal 24 are scaled down by resistor dividers and applied as feedback voltages (Vc fb and Vin fb) to the regulator 52. The regulator 52 includes a smoothing output stage and switches a transistor at a duty cycle necessary to keep the scaled Vc feedback voltage equal to the scaled Vin voltage. As a result, the regulator 52 keeps Vc/Vin at a predetermined ratio (step 54 of FIG. 3). The regulator 52 is configured to maintain Vc at a preselected voltage greater than Vin so that there is a limited maximum voltage across the switches 27 and 34. The current supplied to the Vin terminal 24 is totally supplied by the Vc voltage signal, generated from the voltage spikes, input into the regulator 52. This current, recovered from the voltage spikes, augments the current to the converter 20 supplied by the main power supply 22 (step 56 of FIG. 3).

In another embodiment, the filter for filtering the main power supply voltage is also used as the output filter stage of the regulator 52.

Figure 4:
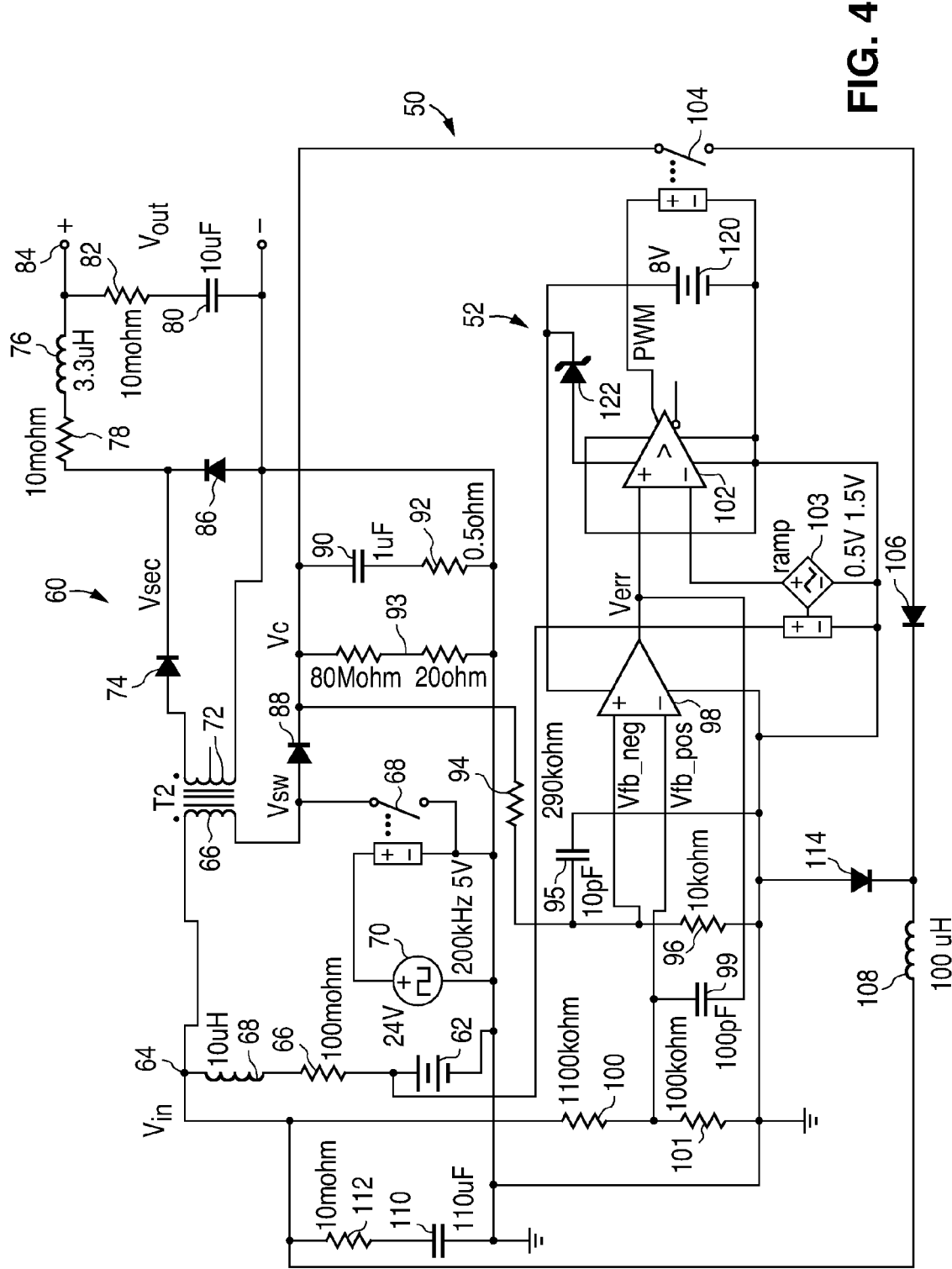
FIG. 4 is a schematic diagram of a forward converter, incorporating the invention, used to simulate operation of the invention.

FIG. 4 is a particular embodiment of a converter 60 that employs a recovery circuit 50. Many variations of the converter 60 are possible. The converter 60 was used for simulation, and various components are not necessary for adequate operation.

The main power supply 62 supplies 24 volts. A negative terminal of the power supply 62 is connected to ground, and a positive terminal is connected to the Vin terminal 64 via resistor 66 and filtering inductor 68. The Vin terminal 64 is connected to primary winding 66 of transformer T2. A transistor switch 68 is controlled by a square wave generator 70 at 200 kHz to turn switch 68 on and off at a certain duty cycle to achieve the desired output voltage of the converter 60.

When switch 68 is on, the resulting voltage through the secondary winding 72 forward biases diode 74, which then charges output inductor 76 through resistor 78. The current ripple through inductor 76 is smoothed by an output capacitor 80, connected via a resistor 82 to the output terminal 84 of the converter 60, to provide a DC voltage (Vout) to a load.

When switch 68 turns off, the polarity across inductor 76 reverses and forward biases diode 86, connected to ground. This allows inductor 76 to then discharge its stored energy into the output capacitor 80 and the load.

When switch 68 is turned off, a voltage spike through primary winding 66, due to leakage inductance, forward biases diode 88. The spike is smoothed by capacitor 90, connected to ground via resistor 92. The voltage across capacitor 90 provides the input voltage for a PWM regulator 52. A high value resistor path 93 to ground, across capacitor 90, slowly discharges capacitor 90 in the event the converter 60 is shut down.

The Vc voltage provided by the capacitor 90 is divided by a resistor divider formed of resistors 94 and 96. The divided voltage is a Vc feedback voltage applied to an input of an error amplifier 98. A small capacitor 95 filters the Vc feedback signal. The Vin voltage at terminal 64 is divided by a resistor divider formed of resistors 100 and 101 to create a Vin feedback voltage applied to a second input of error amplifier 98. A capacitor 99 is connected between the output of the error amplifier 98 and the Vin feedback voltage terminal. The output of error amplifier 98 (called the error voltage) is a voltage corresponding to the duty cycle of the regulator 52 necessary to cause the Vc feedback signal to match the Vin feedback signal. The error voltage increases when the Vc feedback signal is above the Vin feedback signal, and the error voltage decreases when the Vc feedback signal is below the Vin feedback signal.

The error voltage is compared, using comparator 102, with a sawtooth waveform output from ramp generator 103. The output of comparator 102 is connected to a switch 104, where the switch 104 is on until the ramp crosses the error voltage. The switch 104 remains off for the remainder of the ramp cycle. Switch 104 may be a MOSFET or a bipolar transistor. With a higher duty cycle, more current is drained from capacitor 90 to maintain Vc/Vin at a predetermined ratio, where Vc is selected to limit the voltage across switch 68 to an acceptable level, such as double or triple Vin.

When switch 104 is closed, diode 106 is forward biased, which causes current to energize inductor 108. The ramping current through inductor 108 is filtered by capacitor 110, via resistor 112. The voltage generated at capacitor 110 is equal to Vin. The capacitor 110 supplies current to the Vin terminal 64 to supplement current provided to the Vin terminal 64 by the main power supply 62.

When switch 104 is opened, diode 106 is reverse biased and diode 114, connected to ground, is forward biased to provide inductor 108 with a circuit for discharging its stored energy into capacitor 110 and to the Vin terminal 64.

An 8 volt source 120 is shown providing power to the error amplifier 98 and comparator 102. A zener diode 122 sets the voltage level into comparator 102. The voltage source 120 may be derived from the main power supply 62.

To avoid beat frequencies, a sync signal may be provided to the ramp generator 102 from the square wave generator 70.

The converter 60 may use feedback of the output voltage Vout to regulate Vout by adjusting the duty cycle or switching frequency of the switch 68. Such means of regulation are well known and need not be described in detail.

Any type of step down regulator 52 may be used, and any type of transformer-coupled converter may be used, while still achieving the benefits of the invention. In a simpler embodiment, the buck regulator is a hysteresis type using bursts of switching pulses to keep the Vc feedback signal approximately matched to the Vin feedback signal.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A transformer-coupled DC-DC converter comprising:
    a voltage input terminal for connection to a main power supply for supplying power to the converter at a first supply voltage;
    a primary winding of a transformer;
    a first switch controlled to intermittently conduct a current from the voltage input terminal through the primary winding, the primary winding generating a ramping current when the first switch is turned on and generating a momentary voltage pulse upon the first switch turning off;
    a secondary winding of the transformer supplying a current to an output circuit for providing a DC output voltage of the converter; and
    a voltage regulator receiving at a regulator input terminal an input voltage generated from the momentary voltage pulse, the regulator comprising a second switch for intermittently coupling the regulator input terminal to an output filter of the regulator, the output filter of the regulator being coupled to the voltage input terminal of the converter, the regulator controlling the input voltage to be at a regulated voltage, such that at least some of the energy in the voltage pulse is returned to the voltage input terminal and a voltage across the first switch is limited by the input voltage of the regulator, wherein
    at least some of the energy in the voltage pulse is returned to the voltage input terminal upon each switching cycle of the first switch while the input voltage into the regulator is being regulated.

2. The converter of claim 1 wherein the regulator is a pulse width modulated (PWM) regulator.

3. The converter of claim 1 wherein the regulator determines a difference between a first voltage, corresponding to the input voltage of the regulator, and a second voltage, corresponding to the first supply voltage, and, in response, controls the second switch to keep the first voltage approximately matched to the second voltage.

4. The converter of claim 1 further comprising an input voltage filter connected to the voltage input terminal.

5. The converter of claim 4 wherein the output filter of the regulator includes the input voltage filter.

6. The converter of claim 1 wherein the main power supply is coupled to a center tap of the transformer, and wherein the primary winding is a first primary winding, the transformer also comprising a second primary winding, the converter further comprising a third switch controlled to intermittently conduct a current from the voltage input terminal through the second primary winding, the second primary winding generating a ramping current when the third switch is turned on and generating a momentary voltage pulse upon the third switch turning off.

7. The converter of claim 1 further comprising a first diode connected between a first end of the primary winding and the regulator input terminal, the first diode being forward biased during at least a portion of the time that the momentary voltage pulse is generated.

8. The converter of claim 7 wherein the first switch is connected to the first end of the primary winding.

9. The converter of claim 8 further comprising a capacitor filter connected to the regulator input terminal.

10. The converter of claim 1 wherein the main power supply is coupled to a center tap of the transformer, and wherein the primary winding is a first primary winding, the transformer also comprising a second primary winding, the converter further comprising:
    a third switch controlled to intermittently conduct a current from the voltage input terminal through the second primary winding, the second primary winding generating a ramping current when the third switch is turned on and generating a momentary voltage pulse upon the third switch turning off;
    a first diode connected between a first end of the first primary winding and the regulator input terminal, the first diode being forward biased during at least a portion of the time that the momentary voltage pulse is generated when the first switch turns off, wherein the first switch is connected to the first end of the first primary winding;
    a second diode connected between a first end of the second primary winding and the regulator input terminal, the second diode being forward biased during at least a portion of the time that the momentary voltage pulse is generated when the third switch turns off, wherein the third switch is connected to the first end of the second primary winding; and
    a capacitor filter connected to the regulator input terminal.

11. The converter of claim 1 further comprising a control circuit for adjusting switching of the first switch to regulate the DC output voltage of the converter.

12. The converter of claim 1 wherein the voltage regulator receives a first voltage corresponding to the input voltage of the regulator and a second voltage corresponding to the first supply voltage and controls the second switch to maintain the first voltage and the second voltage at a predetermined ratio.

13. The converter of claim 12 wherein the voltage regulator maintains the first voltage at a certain level that is higher than the second voltage to limit a maximum voltage across the first switch.

14. A method performed by a transformer-coupled DC-DC converter comprising:

supplying power from a main power supply to a voltage input terminal of the converter at a first supply voltage;

controlling a first switch connected to a primary winding of a transformer to intermittently conduct a current from the voltage input terminal through the primary winding, the primary winding generating a ramping current when the first switch is turned on and generating a momentary voltage pulse upon the first switch turning off;

supplying a current, by a secondary winding of the transformer, to an output circuit for providing a DC output voltage of the converter; and receiving at a voltage regulator input terminal an input voltage generated from the momentary voltage pulse; and controlling a second switch in the voltage regulator for intermittently coupling the regulator input terminal to an output filter of the regulator, the output filter of the regulator being coupled to the voltage input terminal of the converter, the second switch being controlled to cause the input voltage to be at a regulated voltage, such that at least some of the energy in the voltage pulse is returned to the voltage input terminal and a voltage across the first switch is limited by the input voltage of the regulator, wherein at least some of the energy in the voltage pulse is returned to the voltage input terminal upon each switching cycle of the first switch while the input voltage into the regulator is being regulated.

15. The method of claim 14 further comprising the voltage regulator receiving a first voltage corresponding to the input voltage of the regulator, receiving a second voltage corresponding to the first supply voltage, and controlling the second switch to maintain the first voltage and the second voltage at a predetermined ratio.

16. The method of claim 15 wherein the output filter of the regulator includes a filter connected to the voltage input terminal.

* * * * *